WITNESSES
A. T. Palmer
Mary A. Ryan

INVENTOR
MERL R. WOLFARD
BY
Mitchell, Chadwick
& Kent
ATT'YS.

M. R. WOLFARD.
INTERNAL COMBUSTION ENGINE.
APPLICATION FILED FEB. 17, 1915. RENEWED FEB. 13, 1919.

1,305,581.

Patented June 3, 1919.
4 SHEETS—SHEET 4.

WITNESSES

INVENTOR
MERL R. WOLFARD
BY
ATTYS.

UNITED STATES PATENT OFFICE.

MERL R. WOLFARD, OF CAMBRIDGE, MASSACHUSETTS, ASSIGNOR OF ONE-FOURTH TO LEROY A. AMES, OF SPENCER, MASSACHUSETTS, AND ONE-FOURTH TO EVERETT E. KENT, OF NEWTON, MASSACHUSETTS.

INTERNAL-COMBUSTION ENGINE.

1,305,581.  Specification of Letters Patent.  Patented June 3, 1919.

Application filed February 17, 1915, Serial No. 8,828. Renewed February 13, 1919. Serial No. 276,868.

*To all whom it may concern:*

Be it known that I, MERL R. WOLFARD, a citizen of the United States, residing at Cambridge, in the county of Middlesex and State of Massachusetts, have invented new and useful Improvements in Internal-Combustion Engines, of which the following is a specification.

This invention relates to improvements in internal combustion engines, more particularly those using a liquid fuel. It is an object of the invention to attain certain new and valuable results in the direction of safety, simplicity, lightness and efficiency; and to do this by the use of a new mechanism for the thermo-dynamic conversion of energy. The invention, which may be practised in several ways and with the aid of various forms of mechanism, is concerned with the management of the conditions and materials of combustion. It provides for continuous and progressive stratification of engine contents during a period in which combustion of materials, such as a liquid hydro-carbon and air, is occurring simultaneously with the introduction of fresh material for continuing the combustion, and it does this by the utilization of the combustion itself, and of one or more movable elements, for controlling the flow of air directly from the place where it is being compressed to the place where it is used in combustion, without the intervention of a receiver or other device for storing and supplying it, at constant pressure or at varying pressure as desired. The preferred form of the invention provides for separating, within the engine itself, the time and place of vaporization of the liquid fuel from the time and place of combustion. Cross currents of air and atomized fuel become mixed at a certain location; the local temperature quickly converts the atomized particles into vapor; and the mixture of air and fuel vapor moves forward to a place where the combustion is occurring. The flow of the air with respect to the cross current of fuel occurs at a predeterminate time and rate. This is accomplished and controlled by adding heat of combustion at one end of the column of air while the column is simultaneously being compressed by movement of an element such as a piston at its other end; and this control may be supplemented and made more definite by using another movable element located between the piston and fuel current in the form of a check valve which is so controlled that it opens only to predeterminate, varying degrees during the flowing of the air. The invention includes mechanism for carrying out the process, that form which is preferred because it is most positive and gives greatest flexibility being illustrated herein. In this there is a cylinder in which air is compressed and another cylinder in which the products of combustion expand, the piston of the latter being some 45° in the lead of the air piston. The head ends of these two cylinders are joined by a direct and ample passage or chamber. One end of this passage is separated from the air cylinder by a positively controlled check valve, herein called the intermediate valve, the extent of whose opening under normal conditions varies in a predetermined manner during each stroke, so that the flow of air into the passage is controlled; is maintained at a temperature conducive to prompt vaporization of atomized liquid fuel, but not conducive to its combustion; and has a nozzle through which liquid fuel is injected and atomized. The other end of the passage is continuously open into the power cylinder, and has one or more spots that are maintained at a temperature sufficient to ignite the fuel at each stroke. Upon the closing of the exhaust valve in the power cylinder at a point which may, for example, be about 40° from the inner end of stroke, the hot gases thereby encroached begin to be compressed into the small but inevitable clearance space above the power piston, and some of these gases are gradually forced into the adjacent hot end of the combustion passage. Simultaneously with the closing of the exhaust valve, the device controlling the intermediate valve permits it to open a little, so that compressed pure air is pressed by the air piston into that part of the passage where the fuel nozzle is at about the same rate that spent gases enter its other end. Thus the spent gases and the pure air are stratified in this passage, and as the compression is what may be called "static", no cooling current passes the hot end of the passage in either direction. About this time a simple plunger pump begins to force finely divided liquid fuel into the pure air part of the passage, where it quickly becomes vapor. Simultaneously the device controlling the intermediate valve lets in more air, at higher pressure, so that drift of the fuel laden air begins toward the power cylinder, and the place where combustion occurs. The preliminary combustion at the head of the column, which occurs while the compression stroke is continuing, and may in some cases begin rather early in that stroke, increases the kinetic energy of a body of confined gases thus causing a rise of pressure and provides an obstacle to the advance of the column of air from the piston that is compressing it. This opposing pressure can, by proper design, be made to regulate the flow of air even to the extent of rendering the intermediate valve unnecessary in some cases. Its effect is taken into account in designing the cam which controls the intermediate valve, as also are the continually changing volumes of both cylinders as their pistons move in or out. As the air piston continues its stroke, the column of pure air moves gradually forward to the farther part of the passage where the head of the column burns, having become thoroughly pervaded with fuel vapor on the way. It is important that there be no residual drop of liquid fuel left on the nozzle when the fuel injection ceases. This is accomplished by making the mouth of the nozzle as an elastic slot, the sides of which have minute grooves which concentrate the flow of fuel into streams. The ends of the grooves are always open but are too small for fuel to exude through them when the slot walls are closed together. Such closing occurs upon cessation of pressure of liquid within, which, in turn, occurs instantly upon cessation of pump action, the liquid being practically incompressible and inexpansible. The combustion passage and the power cylinder preferably have a special lining chosen for its quality of tenacity rather than as being a slow heat conductor. For this, an alloy of nickel and pure iron has been discovered suitable. The lining fits the cylinder walls loosely and may be formed in as many separate parts as desired in order to permit the lining to be distorted freely and harmlessly by the extreme differences in temperature. This protects the main walls from the excessive temperatures; first, by shielding them from direct contact and direct radiation from the flame; second, by greatly reducing and diffusing the maximum temperatures absorbed by the inside of the lining at each stroke, before the absorbed heat reaches the outside of the lining; and third, by still further diffusing and greatly reducing the temperature received by the cylinder walls, by the fact of its transfer from one surface to another, which produces an effective reduction even though the two metal surfaces touch each other in places. The passage connecting the two cylinders should be short and direct. In small engines this may easily be arranged with both pistons on the same crank shaft. In larger engines where good mechanical design requires a bearing between the pistons, the cylinders would be too much separated by such a bearing; but the invention provides for solving this problem by offsetting the cylinders to opposite sides of the crank shaft and arranging them in a sharp V form, overlapping each other at the bottom, with the cranks close together. This eliminates the need of a bearing between the cranks, and makes the preferred and compact form of the engine illustrated herein. In some cases the pistons may be arranged with their cranks on two parallel shafts connected by suitable linkage. In that case the cylinders can be close beside each other; and there is the further advantage of providing an easy means for making the engine reversible.

By the mechanism of the invention disclosed herein, the heavier and less volatile oils are successfully burned, because they are completely volatilized before being burned. This is to be contrasted with engines of the Diesel type, for example, where the liquid is injected into air of such temperature that combustion begins in the region where particles are still in liquid form; and the envelop of heat coming from the burning surface of a globule decomposes its interior more or less, making a gummy or carbon deposit. A similar distinction is observed from those engines where liquid fuel is injected against an ignition plate. This completeness of combustion is facilitated by the stratification which is maintained in the combustion chamber, with the result that each particle enters a mass of pure air that is unmixed with products of combustion, whereas, in engines of the Diesel type, the latter half of each fuel charge enters a body of gas which is less than half air. Another feature contributing to the quickness with which complete combustion is attained is the provision by which the body of air that is to support combustion is so massed and moved that the fuel is distributed throughout it. This is unlike engines of the Diesel type, and all engines where fuel is injected through a round nozzle, for example, where the injection is directed toward a particular locality, because under those circumstances the air of the locality becomes quickly consumed, so that the fuel coming later enters a body of spent gases and does not find any air to support its combustion until perchance it encounters air that was in some other part of the cylinder. This quickness of combustion results in all of the heat being added at the top of the cycle, and so, by avoiding delayed combustion, it gives a practical advantage in efficiency over other engines. The conservation of the heat of compression of the air which is to support the combustion makes another important saving, as compared with all combustion apparatus in which an intermediate receiver or storage tank is used; and the continuously high temperature of the walls that are exposed to the hottest gases, owing to the tenacious insulated lining, affords another saving in efficiency. The facts that no more than a small part of the air and oil can be mixed together at any instant during any part of the cycle; that the fuel cannot by leakage get access to any large body of air; and the absence of any storage tanks or receivers, in which vapors of lubricating oil from the air compressor can collect as in engines of the Brayton or Diesel type all continue to render the engine safe from explosion and from those excessive pressures, which, being possible, even though rare, necessitate the design of Diesel engines with very thick and heavy walls. This safety; the elimination of the maximum temperatures from the cylinder walls, and their transfer to a loose, free-to-expand lining; and the characteristic of certainty of stresses, enable the cylinder walls of an engine built for practising the present invention to be designed lighter than has heretofore been safe; or to be made with thinner walls than at present used in Diesel engines, in which case the cylinder diameter can be at least doubled, and since the capacity varies as the square of the diameter, the power is thus quadrupled for a given thickness of cylinder wall.

Moreover, the mechanism herein shown facilitates operation at a considerable overload, which is done by simply supplying air to the air cylinder at a pressure somewhat above that of the atmosphere. In that case more air passes the fuel nozzle at each stroke, so that more fuel can be burned, but, unlike engines of the Diesel type, the greater power is attained without much increase of maximum pressure.

The invention also includes such other features of novelty as characterize the detailed disclosure made hereinafter. Most of the features of the invention can be put into practice in various modifications or forms, some of which are shown and claimed in my co-pending applications for patent Serial No. 8829 dealing with the combustion chamber walls; Serial No. 8830 the fuel injecting nozzle; Serial No. 8831 the cylinder arrangement with parallel shafts and reversing mechanism; Serial No. 8832 the thermo-dynamic process. The claims of this present patent are intended to cover whatever features of patentable novelty exist in the invention disclosed, except such matters as are covered by co-pending applications herein mentioned.

Referring to the drawings, the power cylinder is marked 10, its piston 11, exhaust valve 12 and water jacket 13. The air compressing cylinder is marked 20, its piston 21, its inlet valve for air 22, and its water jacket 23. A chamber or passage 30 makes a short direct connection of ample cross section between the head ends of the two cylinders. This passage is permanently open into the power cylinder; but it is separated from the air cylinder 20 by a mechanically controlled intermediate valve 24. Near this valve 24 in a region cooled by water-jackets 33, 33', (Figs. 1, 7,) is means, here represented by a nozzle 31, for throwing a current of atomized liquid fuel across the passage. Farther along in the passage is an igniting device for use when the engine is starting, here represented by a closed tube 32, which may be heated red by an external gas flame. Near the delivery end of the passage are low ridges 32' which by producing cross currents may aid the rapid and complete mixing of fuel with air. The delivery end of the passage quickly becomes hot enough to ignite subsequent charges of fuel, and its igniting device 32 is then not needed.

Cams $33^a$, $33^b$, $33^c$, $33^d$ and $33^e$, connected in any suitable manner with the main crank shaft, respectively actuate or control the air inlet valve 22, the intermediate air valve 24, the pump 34 by which fuel is injected, the exhaust valve 12 and the starting valve 15. The two pistons, 11 and 21, may be connected to a single main crank shaft 14 or may be arranged on parallel shafts connected by gearing, but in either case they are connected so that air piston 21 lags a suitable amount, which I have found to be about 45°, behind the power piston 11.

Figure 3:
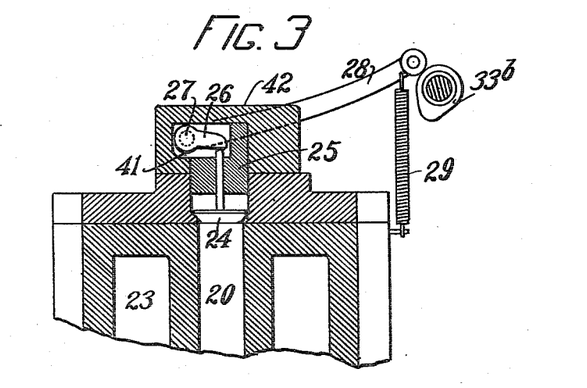
Fig. 3 is an end elevation in section on the line 3—3 of Fig. 2.

In what I regard as the best form of the invention the cam 33ª is arranged so that it opens the air inlet valve 22 a little after the inner end of stroke of the air piston 21 and closes it at or just after the outer end of stroke. The cam 33ᵇ, is formed and set so that it permits the valve 24 to open to a limited extent when the inward stroke of the power piston 11 has reached a predetermined point about 40° of revolution from its inmost limit, this opening being simultaneous with the closing of the exhaust valve 12; and it is formed so that the extent to which the valve 24 may open is controlled minutely, according to a predetermined design which depends upon the position and rate of movement of the power piston and upon its clearance. As here illustrated, the stem of the valve 24 has an easy sliding fit, without packing, in a guide block 25, and is engaged by the short arm 26, of a lever, fulcrumed on a pivot 27, whose long arm 28 is pulled by a spring 29 toward or against the cam 33ᵇ, as indicated in Fig. 3, with sufficient strength to overbalance any pressure normally exerted by air in the cylinder 20 against the valve 24. The result is attained, that the valve is normally opened by pressure of the air in the cylinder 20 to whatever extent the arm 26 is held up at the instant by the cam, but can open further, for safety, in case of an abnormal pressure, sufficient to overcome the spring 29.

Figure 1:
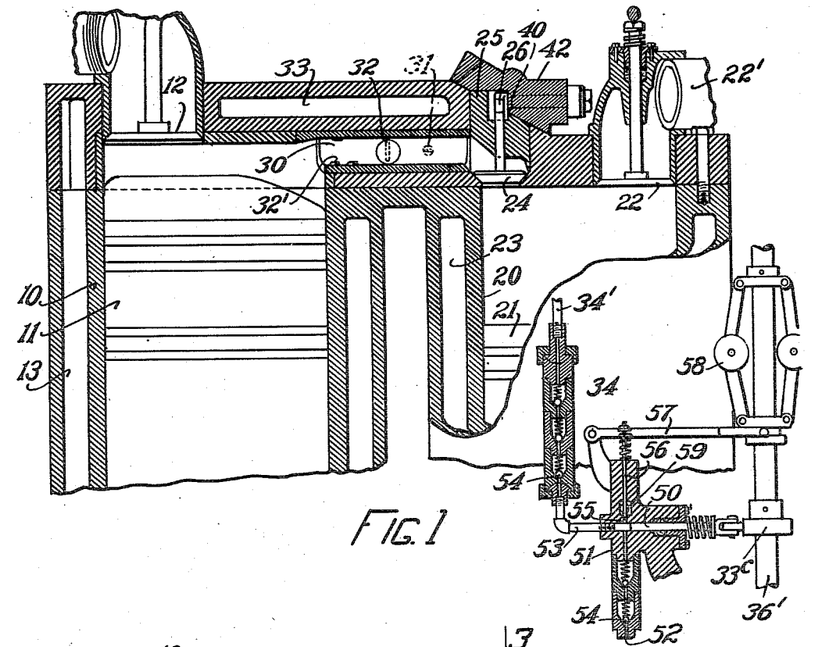
Figure 1 is an elevation in medial section through two cylinders of an upright engine embodying the invention, except a part of one cylinder and apparatus in front of it.

The packing of the valve 24, to prevent leakage, is conveniently arranged in connection with the fulcrum 27 which is a shaft extending laterally, as seen in Fig. 1, having a conical seat or bearing at 40, and an adjusting screw at its outer end to keep this conical bearing from leaving its seat. Any air leaking through beside the stem of valve 24 is thus stopped in the chamber 41. This chamber 41 may be formed in such a way as to be both easily made tight and easily accessible by covering the interior block 25 with an exterior block 42 with suitable gasket clamped down upon the top of the cylinder head. The movement of the fulcrum pivot 27 in turning on its seat 40 is so slight that there is very little wear.

Figures 5, 6:
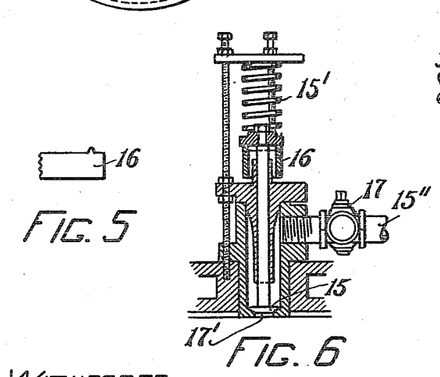
Fig. 5 is a side elevation of a detail which is seen endwise in Fig. 6.
Fig. 6 is an elevation in medial section of the starting and relief valve, being on the line 6—6 of Fig. 2 on a larger scale.

The cam 33ᶜ is set so as to operate the pump 34 in order to begin injection of fuel at the predetermined point in each stroke which may, for example, be about 15° before the end of the power piston's inward travel, and to continue this pump stroke as long as desired. Cam 33ᵈ is to open the exhaust valve 12 at the outward end of stroke of the power piston and to close it at a predetermined point which may, for example, be 40° before the inward end of stroke. The cam 33ᵉ operates a valve 15 which may be provided in the head of the power cylinder to serve the double purpose of a starting valve and a relief valve. This valve is shown in Fig. 6, where is represented the spring 15' which keeps it normally closed but would allow it to open if any abnormal pressure should develop within the power cylinder, in which case contents might escape through the three-way valve 17 to the opening 17'. For starting the engine the valve 17 is set to open the compressed air supply pipe 15'', and then the valve 15 may be lifted periodically by a forked lever 16 operated at first by hand and subsequently by cam 33ᵉ. When the engine has begun to fire the three-way cock 17 may be turned to shut off the air supply and to open the passage 17'; and the cam 33ᵉ may be slipped sidewise out of action. These cams may be located wherever is most convenient, the pump cam being here represented as on a vertical shaft 36' rising from the main crank shaft, and the other four being on a conventional cam shaft 36 driven thereby and extending horizontally past the various valves.

The nozzle 31 for injection of fuel may be of any suitable type. It should break a solid column of liquid fuel into very small liquid particles, in other words, atomize it, and distribute these particles through that part of the chamber 30 toward which it is directed, while the fuel is coming gradually through the nozzle. This results in the distribution of all the fuel through the air which is to support its combustion.

Figure 7:
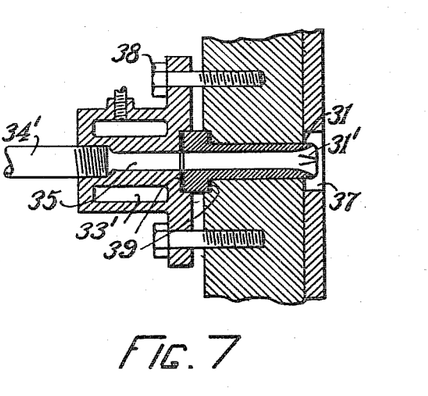
Fig. 7 is a plan in section showing the nozzle 31 and related parts, enlarged.

The particular type of nozzle which I prefer is illustrated in Fig. 7 where pump's delivery pipe 34' is seen connected to a passage 35 leading to the nozzle itself 31. This nozzle is inserted through a hole 37 in the wall of the combustion chamber 30, having an external shoulder made tight by clamping bolts 38 and gaskets 39. The region is cooled by a water jacket 33'. The nozzle itself consists of a simple tube whose inner end has been flattened into an elastic slot, normally closed. Details of construction of such a nozzle are set forth more fully in my co-pending application, Serial No. 8830. It is sufficient here to say that the delivery end of the nozzle is a mere crack, closed, except for minute grooves 31' which extend through the closed portion and are never closed. When the pump pressure is applied to the column of oil in the pipe 34' the oil within the nozzle spreads the slot open, and the oil passes out, mainly in small streams of high velocity whose position and direction are fixed by the grooves. The elasticity of the nozzle tip closes the outlet when the pressure ceases. The said grooves have the effect of making a sharp clean-cut closure, without leaving a residual exudation or drop of the liquid, which, if existing, would cause a reduction of thermo-dynamic efficiency accompanied possibly by deposits of carbon owing to the late combustion of the residual drop and the possible carbonization of this oil. The relation of the grooves to each other may be such as to contribute to the atomizing effect of the discharge. To that end they are preferably formed converging in both upper and lower halves of the nozzle, the ends of the adjacent grooves on opposite parts of the nozzle being not precisely opposite each other so that the streams coming through each pair meet somewhat tangentially just outside of the nozzle and are both broken into finely divided particles, which are distributed throughout the chamber in front of the nozzle.

While any suitable means for forcing the liquid fuel positively through this nozzle may be employed, I prefer to use a very simple plunger pump 50 acting upon a body of liquid fuel which stands in continuous body up to the elastic slot of the nozzle, with a simple overflow governor. As herein illustrated the pump and governor are operated by the vertical cam shaft 36'. The pump chamber 51 has an inlet passage 52 and a discharge 53, both of which are guarded by ball check valves 54, arranged tandem with as many in each series as may be desired, as well seen in Fig. 1. Another discharge passage, 55, is partly closed by a needle valve 56 whose position is varied from time to time by a lever 57 controlled by the governor 58, so that increase of speed of the engine opens the needle valve further. The whole amount of fuel displaced by the plunger at each stroke is thus divided between that which goes into the engine and that which returns, through the overflow pipe 59, to the source of supply unused. The position varies according to the speed of the engine, in case of a constant speed engine using an automatic governor; or it can be varied by the operator at will by moving the lever 57 by hand in case the engine is not automatically controlled in this particular.

Figure 4:
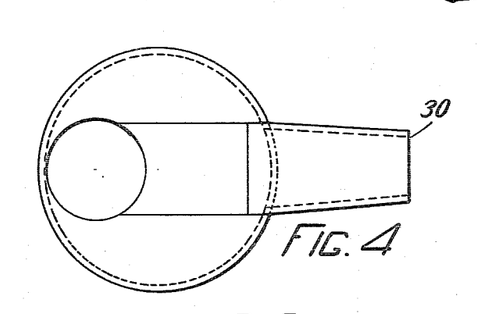
Fig. 4 is a plan of certain details.

The combustion chamber or passage 30 is designed to afford a short, direct and ample passage for the main body of air from its compressor into the power cylinder. In this respect the invention differs from prior engines which have had to use an intermediate receiver; and from those modifications of the Diesel type, in which an auxiliary piston forces a fractional part of the air through a passage of restricted capacity, so that the pressure of the small part rises so extremely high as to blow the fuel into the power cylinder into the waiting main body of air which is to support its combustion. In the engine now being described, the cross section of the passage 30 is to be designed of such large and ample area that the main body of air that is to support combustion can flow copiously from the valve 24 and cylinder 20 without appreciable restriction, or compression above the normal working pressure, due to inadequate size of the passage 30. That end of the passage 30 which is next to the power cylinder is continuously open. It may have ridges in its wall as illustrated in the drawings, Figs. 1 and 4. These may be arranged so as to make cross currents in the flaming mixture and thus further mixing to aid combustion of the more difficult oils. In any case, after the engine has been in operation for a few seconds they become and remain hot enough to ignite succeeding charges. In view of the peculiar style of operation of this engine, in which the power cylinder, and particularly the combustion chamber, are not subjected at each stroke to blasts of fresh air, which have a certain cooling effect, and the further peculiarity as contrasted with engines of the Diesel type that the engine may be designed to run at pressures where the temperature of the compressed contents of the power cylinder is not sufficient to ignite the incoming charge, it is desirable to have the surface of the chamber 30 and the head end of the power cylinder suitable to retain a high temperature and to withstand the effects of such high temperature. A means which I have devised for accomplishing that is set forth in my co-pending application for patent, Serial No. 8829, to which reference is made for further description in detail, except that it may here be mentioned that the combustion chamber and the head end of the power cylinder have a lining as seen clearly in Fig. 1 which is separate from the main wall. Preferably this is of tenacious material, without regard to its heat conductivity, made in two or more pieces, set loosely in place but fitting rather closely to the adjacent wall of the cylinder. The looseness permits expansion and contraction under the extremes of temperature to which the engine is subject, without injurious effects tending to fracture any part; and the fact, that heat escaping from the interior must pass from a surface of this lining across a crack or gap into another piece through its surface, sufficiently retards the escape of heat so that the necessary internal high temperature may be retained between successive combustions while at the same time the outside of the cylinder head can be cooled sufficiently by water or other means to permit of the adequate operation of the exhaust valve; and the cylinder walls themselves are vastly relieved of stresses of unequal expansion. I have found that ordinary materials are inadequate for the continuously high temperature which it is advantageous to have in this part of the engine, but that an alloy of nickel and pure iron in the proportions of 36 and 64 is tenacious at those temperatures.

Figure 2:
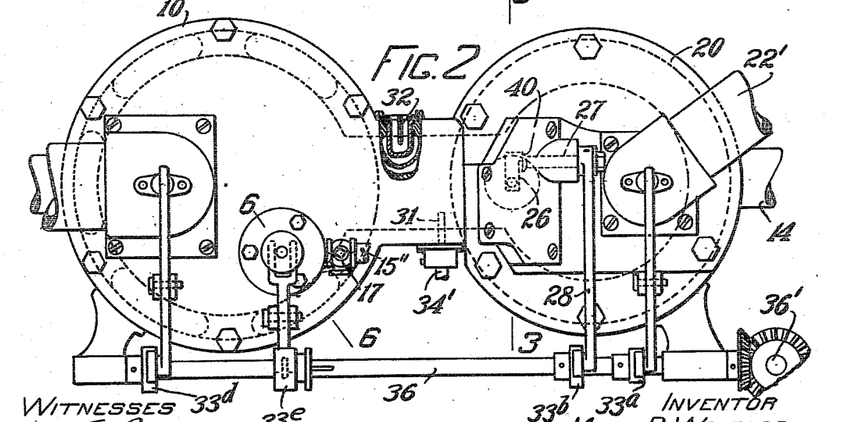
Fig. 2 is a plan of the same showing the cylinder heads.
Figure 8:
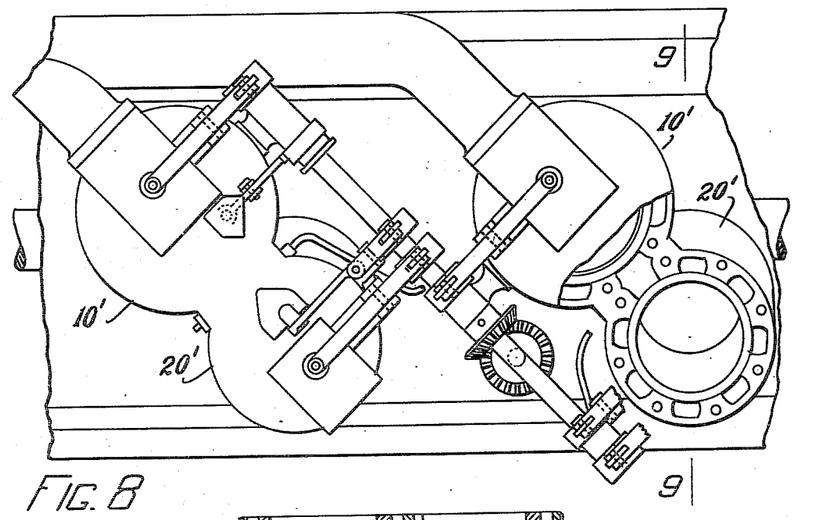
Fig. 8 is a plan of part of a multicylinder engine.
Figure 9:
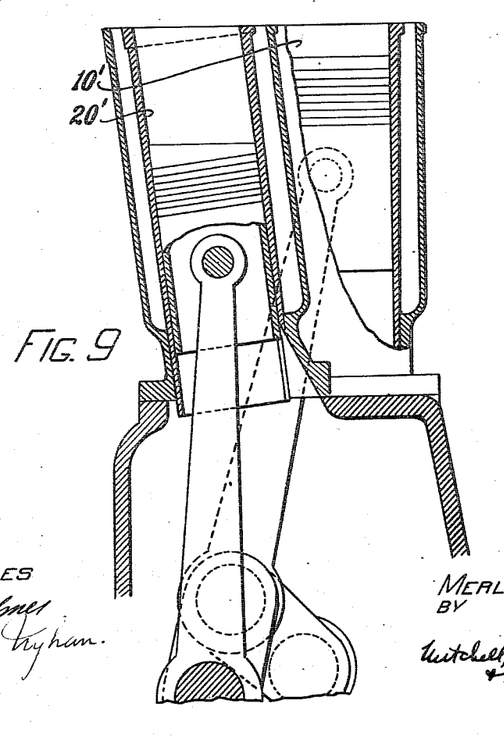
Fig. 9 is an end elevation of the same in section on the line 9—9 of Fig. 8.

The mechanical connections to provide the desired degree of lag of the air compressor piston behind the power piston may be made by any suitable means. In Figs. 1 and 2 the cylinders are represented arranged so that their pistons can be connected to a single shaft in the usual way. In large sizes, however, good mechanical construction requires a bearing for the crank shaft between the two pistons; and the space required for this bearing may force the cylinders too far apart for the advantages obtainable by use of a short ample passage 30 connecting them to be fully secured. For the highest efficiency and most flexible operation, this passage, which is a part of the clearance, should neither contain too much space, nor be too small of cross section and attenuated. Partly for this reason I have devised improvements over the simple form shown in Figs. 1 and 2. One is illustrated in Figs. 8 and 9 hereof. In the form shown in Figs. 8 and 9 the necessity of a bearing between the two crank connections is eliminated by setting the cylinders overlapping each other, as projected on a plane passing through the crank shaft, and putting them into planes at an angle with each other so that they appear in V-form when projected on a plane perpendicular to the crank shaft, and preferably also so that each is offset a little from a plane passing through the crank shaft parallel to its own axis.

In the drawings 10′ marks the power cylinder and 20′ the air cylinder thus arranged. Because of the offsetting the power stroke of each works to greater advantage on its crank. This V-offsetting incidentally requires a suitable change of the angle between the cranks, in order to produce the desired degree of lag of the air piston. This arrangement permits of the tops of the cylinders being placed close enough together for the desired ample cross section and short length of the passage 30′, as above explained, to get best thermo-dynamic effect; it brings the cranks so close together that a shaft bearing on each side of the pair is adequate; and it makes a very compact engine, a point of especial value in multicylinder construction, where many cranks are on a single shaft.

The operation of the preferred form of the engine, in which the maximum pressure does not exceed 350 or 400 pounds per square inch, is as follows, it being understood that each power cylinder with its air cylinder, the combustion passage connecting them, and the incidental mechanism constitutes a complete power unit: The exhaust valve, which remains open during the greater part of the inward stroke, approximately 140° for example, gives the spent gases ample opportunity to escape, so that no scavenging air is used or needed. The compressing part of the power piston's stroke, which follows the exhaust valve closure, does not raise the pressure very high because in the preferred form the clearance, including the combustion passage, is relatively large. The rise of pressure to the maximum is attained by combustion of a part of the charge during the continuance of compression, a means contrary to what has always hitherto been considered the only sound practice. The power piston forces some of the entrapped gases into the adjacent end of the combustion passage. There they are localized by the simultaneous action of the air piston and cam 33$^b$ in compressing pure air and admitting it to the other end of the combustion passage, where it likewise is localized. When the cam 33$^c$ actuates the pump 50 and nozzle 31 to throw atomized liquid fuel into the air, the cam 33$^b$ controlling the intermediary valve coöperates with the air piston to let more air in so that movement of the fuel laden air begins toward the power cylinder. As there has been no considerable cooling draft past the combustion region the high superficial temperature left in its walls by the past preceding period of combustion remains, and ignites the fuel. The early part of the combustion gradually raises the pressure to the working maximum, notwithstanding the large clearance. The quantity of fuel needed for this, and of air to support its combustion, together with the concurrent movement of the power piston which is passing its inner end of stroke and starting out, and of the air piston which has a substantial portion of its compression stroke unfinished, may be taken into consideration in designing the fuel cam 33$^c$ and the intermediary valve cam 33$^b$. The feed of fuel and air may be regulated so that after the maximum pressure has been reached the fuel is burned gradually at constant pressure. I have discovered that by starting the combustion during the compression contrary to the well known rule that the heat should be added only at the top of the cycle, high thermal and thermodynamic efficiency may be obtained with a mechanism in which it is impossible to develop excessive pressures, due to leakage of fuel, etc., so that, as a result a lighter and safer engine than heretofore can be constructed with efficiency substantially comparable to that of the constant pressure engines, and greatly exceeding that of explosive oil engines. Those features of the invention which provide for normal operation with stratification and gradual combustion at a controlled rate contribute to this; but if an abnormal explosion should occur, due to preignition of what might remain or collect as an unburned charge in any stroke, it would have a relative clearance space more than double that of an engine of the Diesel type (which is mentioned for comparison as being the engine most nearly corresponding in efficiency) and therefore, the maximum possible explosive pressure would be less than half as high as may occur in a Diesel engine.
Other features which contribute to the safety and high efficiency are that owing to the stratification of contents and of temperatures the fuel becomes completely vaporized and distributed uniformly through its air before being burned; and when burned is burned completely and quickly. The continuous and progressive stratification provides successive zones or regions; first, pure air; next, air charged with evaporating and evaporated fuel too cool to burn; next, the same burning; and last, a region filled only with the products of combustion.

While the foregong is the preferred form for practising the invention, various modifications may be made. For example, the intermediate valve may be merely a check valve, uncontrolled by external mechanism; or it may be omitted entirely as indicated in the diagram, Fig. 11, in which case the pressure of gases caused during the compression stroke by the combustion in the passage at the head end of the column of air is relied upon to retard or regulate the flow of air according to a predetermined rate of increase in pressure. The rate of flow of the fuel may be controlled by the pump so as to correspond.

Figure 12:
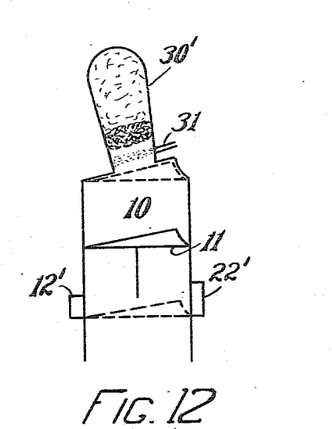

Or, the engine may be still further simplified by the omission of the air cylinder and the substitution therefor of a single cylinder with a combustion chamber at its head in the form of a cul-de-sac 30', with the fuel injection nozzle adapted to spray atomized fuel across its entrance, as indicated in Fig.
12. In such case air may be admitted to the power cylinder by a piston opened port 22', as in an ordinary two cycle engine, or by other suitable means. Upon the inward stroke this air, which has no fuel mixed with it, is gradually forced from the cylinder 10 into the chamber 30'. At some predetermined point during the compression, which may, for example, be about at midstroke, injection of fuel at the neck of the chamber begins at a controlled rate, which at first is a low rate. Combustion ensues at a correspondingly low rate. If the temperature be high enough for instant ignition, this combustion begins with fuel injection, or, if the temperature be not high enough, this fuel is vaporized by the retained heat of that region, and is carried into the chamber with the fresh air into which it has been thrown until in the depth of the chamber it comes to a region which has sufficient temperature to ignite it. In either case combustion begins in the midst of the compression stroke, and continues at a slow rate during the latter part of the stroke, with the effect that the heat thereby liberated increases the pressure of gases within the chamber 30' and delays the entrance of air from the cylinder. This causes stratification. However, the advance of the piston up to the dotted line position of Fig. 12 gradually forces the air in; and fuel is injected at a rate proportionate to the rate at which the air which is to support its combustion is passing the fuel nozzle. Under these circumstances, and in view of the slight lag, a large part of the combustion may occur at constant volume, while the piston is passing its inner dead center. The products of combustion then issue from the chamber and expand behind the piston, until the piston uncovers the exhaust ports 12'.

In an engine of the general type shown in Figs. 1 and 2 the compression may be carried to such high degree that ignition results upon the injection of oil into the air portion of the combustion chamber. In that case the advantages of preliminary vaporization of the oil, as above set forth, are not attained; but the stratification of contents, and the flow of air relative to the flow of fuel, mixing the fuel only with pure air and not with spent gases, contribute to the attainment of a complete and prompt combustion.

Expansion to the end of stroke of the power piston provides a ratio of expansion materially greater than the ratio of compression, because in the construction illustrated the power cylinder is half as large again as the air cylinder. This gains a considerable amount in efficiency. The engine may be worked at overload by the simple device of supplying air to the air cylinder under a small pressure; as by connecting the inlet valve 22 to a pipe 22' leading from a rotary blower, delivering air for example, at 8 or 10 pounds per square inch. The extra air thus introduced can burn extra fuel, but as the combustion is gradual and is at constant pressure, about forty per cent. more work may be done above the normal full load of the engine, without any considerable increase of pressure.

Figure 10:
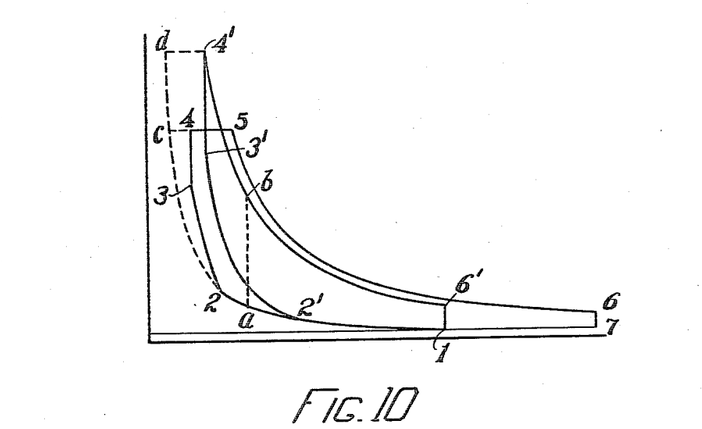
Fig. 10 is a diagram illustrating forms which certain thermo-dynamic cycles may take.

Thermo-dynamic cycles, which can theoretically be carried out in the engine herein disclosed, are shown in Fig. 10, together with cycles of engines of the Diesel type and of the oil-fuel explosion type for comparison. The full lines 1—2—3—4—5—6—7—1 indicate the theoretical cycle of pressure and volume changes in a heat engine of the type of Fig. 1, operated as described, the line representing the composite effect in the whole space 10, 30 and 20. In an indicator card taken from an actual performance of the cycle, the lines would be modified somewhat, by rounding of corners and by other variations, as is well understood, but the process will be best explained by ignoring such departures from the ideal. In the process a confined body, of the working medium is compressed by mechanical means, starting at or near atmospheric pressure. As the volume is reduced, the pressure rises along an adiabatic line from 1 until a point 2 is reached where a definite addition of heat begins. Beyond that, heat is added gradually, simultaneously with the continuance of the mechanical compression, so that the pressure of contents rises along the line 2—3—4. The body of gases thus compressed is, or may be, partially composed of products of the combustion which occurred in the last preceding cycle, but the predominating portion is pure air more or less completely separated from said products of combustion; and the heat added is the product of the combustion of a small amount of fresh fuel which is introduced gradually into a sufficient quantity of air to support its combustion, the rate being controlled by suitable means. The continuation of the line 1—2 as it is dotted up to the point $c$ shows the adiabatic line of compression which would be followed if the heat of combustion above mentioned were not added. The full line from 2 to 3 which represents the actual result, is the adiabatic line modified by the gradual addition of a small amount of heat; and the line from 3 to 4 indicates the increase of pressure resulting from the continued addition of heat by combustion while the engine crank is passing over its inner dead center. The point to which this raises the pressure may, for example, be 400 pounds per square inch. The distance from the point 4 to the adjacent vertical axis indicates the clearance space; and it is to be noted that this clearance is approximately double what the clearance would be if the same pressure had been obtained by simple adiabatic compression as in an engine of Diesel type, as shown by the dotted line. The line 4—5 represents the main addition of heat, by gradual introduction of fuel into the air, and its combustion at constant pressure, as long as may be desired. From 5 to 6 is the expansion line, adiabatic, after which confinement of the contents ends. The pressure falls, ordinarily to atmospheric, upon the opening of an exhaust valve, and the spent gases escape more or less completely, depending on the type of engine in which the process is being carried out; fresh air is drawn in or forced in as the case may be; and the cycle may be repeated.

Figure 11:
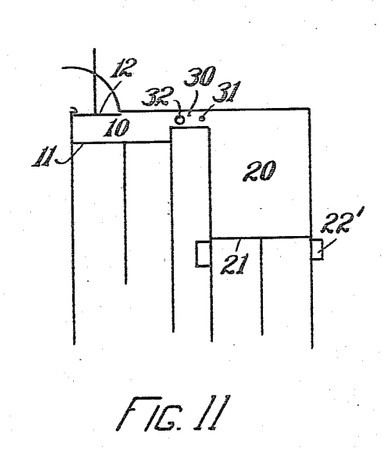
Figs. 11 and 12 are diagrams of modifications.

For the engine of Figs. 11 and 12 the typical cycle is shown by the solid lines 1, 2′, 3′, 4′, 6′, 1. Here as illustrated, addition of heat by combustion begins in the middle portion of the compression stroke and continues gradually until the point 3′ is reached; the remaining heat of the cycle is added by combustion at constant volume; then adiabatic expansion occurs, from 4′ to 6′, followed by exhaust, as before. The line $a$—$b$ enables comparison with low pressure oil engines to be made. In such engines as heretofore operated, the fuel is injected and mixed with the air during the compression stroke and heat is added at constant volume as on the line from $a$ to $b$, the line $b$—6′ representing expansion. To prevent preignition such an engine must have a large clearance space, as indicated by the distance of the line $a$—$b$ from the vertical axis. In the engine of Figs. 11 and 12 the clearance is less because, the fuel being introduced gradually, no great quantity of fuel is ever normally present unburned at any one time. With this goes increase in maximum pressure, resulting in both greater efficiency and greater capacity.

I claim as my invention:—

1. In an internal combustion engine having a power cylinder and piston, a confined space with a displacing element adapted to compress and displace air, and a passage connecting said space with the head end of the cylinder, in combination, throttling means in said passage, means to introduce fuel into said passage and means to ignite fuel within said passage; the whole being adapted and arranged to force the main charge of air for each cycle through said passage and past the place of fuel introduction, and for mixture and combustion of the same to occur progressively with flow toward and into said cylinder, and with said throttling means adapted to regulate the flow of said air past the place of fuel introduction during a portion of said combustion which occurs while the pressure is increasing simultaneously within said cylinder and said confined space.

2. In an internal combustion engine having a power cylinder and piston, a confined space with a displacing element adapted to compress and displace air, and a passage connecting said space with the head end of the cylinder, in combination, throttling means in said passage, means to introduce liquid fuel in spray form at a graduated rate across said passage during a definite period of each cycle, a device for igniting fuel within said passage; the whole being adapted and arranged to force the main charge of air for the cycle through said passage and of fuel across said passage so that they intersect with the portions of each in the resulting mixture approximately uniform during the continuance of combustion, with combustion occurring progressively with flow toward and into said cylinder, said throttling means being adapted to regulate the flow of said air during that portion of said combustion which occurs while the pressure is increasing simultaneously within said cylinder and said confined space.

3. In an internal combustion engine having a power cylinder and piston, a fuel mixing and combustion passage connected to the head end of the cylinder, and an exhaust valve arranged to remain open until said piston is near its head end of stroke, whereby a relatively low pressure as compared with the maximum pressure in each cycle, exists in the clearance space when introduction of the charge of air and fuel begins; in combination means to introduce fuel into said passage, means to supply a main charge of compressed air, a device for igniting the mixture, the whole being arranged for mixture and combustion of said air and fuel to occur progressively with flow toward and into said cylinder: and throttling means arranged to regulate said supply of air during that portion of said combustion which occurs while the pressure is increasing within said clearance space.

4. In an internal combustion engine having a power cylinder and piston, a fuel mixing and combustion passage connected to the head end of the cylinder, and an exhaust valve arranged to remain open until said piston is near its head end of stroke, whereby a relatively low pressure compared with the maximum pressure in each cycle exists in the clearance space when introduction of the charge of air and fuel begins; in combination, means to introduce liquid fuel in spray form at a graduated rate across said passage during a definite period of each cycle; means to supply a main charge of compressed air and to force it across the path of said spray, a device for igniting fuel within said passage, the combustion occurring progressively with flow toward and into said cylinder; and throttling means arranged to regulate the supply of air at a rate approximately proportional to the rate of fuel supply during that portion of combustion which occurs while the pressure is increasing within said clearance space.

5. An internal combustion engine including in combination, a power cylinder and piston; an air cylinder with piston lagging behind the power piston; a passage connecting the cylinders; a check valve between the mixing and combustion part of said passage and air cylinder; means to introduce liquid fuel into the passage gradually while air is moving therethrough toward the power cylinder, and means permitting a restricted opening of the check valve while the air is being compressed.

6. An internal combustion engine including in combination, a power cylinder and piston; an air cylinder with piston lagging behind the power piston, a passage connecting the cylinders; a check valve between the mixing and combustion part of said passage and air cylinder; and means to introduce liquid fuel into the passage gradually while air is moving therethrough toward the power cylinder, and a cam to limit the degree of said check valve opening while the air is being compressed.

7. An internal combustion engine including in combination, a power cylinder and piston; an air cylinder with piston lagging behind the power piston; a passage connecting the cylinders; a check valve between the mixing and combustion part of said passage and air cylinder; means to introduce liquid fuel into the passage gradually while air is moving therethrough toward the power cylinder; means permitting a restricted opening of the check valve while the air is being compressed; and a normally stiff element adapted to yield and permit further opening of said valve under abnormal pressure.

8. In an internal combustion engine including in combination a power cylinder and piston; an air cylinder with piston lagging behind the power piston; a short and direct passage connecting the cylinders, through which passage the main body of air which is to support combustion is forced; throttling means between the mixing and combustion part of said passage and air cylinder effective while said air is being compressed in said air cylinder; and means to introduce fuel into said passage at a definite rate approximately proportional to the quantity of passing air, the passage being arranged and adapted for ignition to occur, while the fuel and air thus mixed are moving therethrough toward the power cylinder.

9. An internal combustion engine including in combination, a power cylinder and piston; an air cylinder adapted to hold all of the air for a cycle of operation, with a piston lagging behind the power piston; a passage connecting the cylinders; means to hold in rigid confinement a continuous body of liquid fuel extending to said passage; and means to reduce the volume of said confined space at a predeterminate rate, thereby forcing liquid into said passage; the whole being organized and arranged with the injection of fuel, the movement of air toward the power cylinder and the combustion beginning approximately at the same time and continuing simultaneously during the inward stroke of the air piston.

10. An internal combustion engine including in combination, a power cylinder and piston; an air cylinder adapted to hold all of the air for a cycle of operation, with a piston lagging behind the power piston, a passage connecting the cylinders; means to spray liquid fuel in finely divided particles into said passage while air is moving therethrough from the air cylinder; and means to control the temperature of said passage so that the sprayed fuel will at first be volatilized but not ignited, the said passage being adapted for combustion to occur continuously in a closely adjacent position while the introduction of fuel is continuing.

11. An internal combustion engine, including in combination a power cylinder and piston; an air cylinder with piston lagging behind the power piston; a passage connecting the cylinders; a valve between mixing and combustion part of it and the air cylinder; a stem therefor wholly within the engine; two rocker arms and a shaft joining them for controlling said valve; one of said arms being within the engine and engaging the same and the other being outside of the engine; and there being a packing for said shaft; and means applicable to the outside arm for controlling the valve; and a block 42, in which said shaft is mounted, separate from the engine on a surface of cleavage passing obliquely through the interior space wherein the inner rocker arm operates.

12. An internal combustion engine including in combination a power cylinder with piston and exhause valve; an air cylinder with piston lagging behind the power piston; and an air inlet valve; a passage connecting the two cylinders; a check valve separating the mixing and combustion part of said passage from the air cylinder; means to retard and regulate the opening of said check valve; and means to inject fuel into the said passage at a definite rate approximately proportional to the quantity of passing air.

13. An internal combustion engine including in combination a power cylinder and piston; an air cylinder with piston lagging behind the power piston; a passage connecting the cylinders; a valve between mixing and combustion part of it and the air cylinder; a stem therefor wholly within the engine, two rocker arms and a shaft joining them for controlling said valve, one of said arms being within the engine and engaging the stem, and the other being outside of the engine; there being a packing for said shaft; and a spring outside of the engine engaging the outside arm and tending to hold said valve on its seat; and means adapted to operate the arm against the tension of said spring.

14. An internal combustion engine including in combination a power cylinder and piston; an air cylinder with piston lagging behind the power piston; a passage connecting the cylinders; a valve between mixing and combustion part of it and the air cylinder; a stem therefor wholly within the engine, two rocker arms and a shaft joining them for controlling said valve, one of said arms being within the engine and engaging the stem, and the other being outside of the engine; there being a packing for said shaft; and a spring outside of the engine engaging the outside arm and tending to hold said valve on its seat; and means adapted to relieve the arm of the effect of the spring to a predeterminate extent.

Signed by me at Boston, Mass., this 15th day of February, 1915.

MERL R. WOLFARD.

Witnesses:
JOSEPH T. BRENNAN,
EVERETT E. KENT.